UNITED STATES PATENT OFFICE.

JOHAN HJALMAR LIDHOLM, OF ALBY, SWEDEN.

PROCESS OF MAKING COMPOUNDS OF ACETYLENE AND CHLORIN.

No. 831,725.          Specification of Letters Patent.          Patented Sept. 25, 1906.

Application filed October 4, 1905. Serial No. 281,363.

*To all whom it may concern:*

Be it known that I, JOHAN HJALMAR LIDHOLM, a subject of the King of Sweden and Norway, and a resident of Alby, in the Kingdom of Sweden, have invented certain new and useful Improvements in the Methods of Producing Compounds of Acetylene and Chlorin, of which the following is a specification.

If chlorin and acetylene are mixed together and the mixture is afterward exposed to the action of sunlight, a reaction, accompanied by an explosion, will take place, whereby hydric chlorid (HCl) is formed and carbon in solid form is separated. If the light is shut out, no reaction will take place.

The present invention has for its object a process for combining the above-mentioned gases so that chlorin compounds of hydrocarbons are formed. This is obtained by diluting a mixture of the gases with a gas indifferent to acetylene and chlorin, such as carbon dioxid, and afterward exposing the gas mixture to the action of chemically active or actinic rays, whereby the reaction takes place very calmly. According to the proportions in which the acetylene and the chlorin are present in the gas mixture the products will be s-tetrachlorid of ethyl ($C_2H_2Cl_4$) or s-dichlorid of ethylene ($C_2H_2Cl_2$) either pure or in mixture with another and other products of addition and substitution. Of these products the tetrachlorid of ethyl and the dichlorid of ethylene are the main, and they are to be separated in the known manner by fractional distillation.

Among chemically active or actinic rays I here cite the rays of radium, Roentgen rays, ultraviolet light, and sunlight. As the intensity of sunlight is very various, I prefer the constant ray sources, such as the other cited ones, and specially the ultraviolet rays which are emitted from mercury-lamps of quartz or any other substances which are penetrable for ultraviolet rays.

The dilution with carbon dioxid is different according to the intensity of the ray sources. By an ultraviolet lamp for three amperes and fifty to sixty volts it is preferable to dilute the gases with about ten per cent. carbon dioxid.

Having now described my invention, what I claim as new, and desire to secure by Letters Patent, is—

1. The herein-described method of producing compounds of chlorin and hydrocarbons, which consists in diluting a mixture of acetylene and chlorin gases with a gas, indifferent to chlorin and acetylene, and then submitting the mixture to chemically active or actinic rays to produce reaction, substantially as described.

2. The herein-described method of producing compounds of chlorid and hydrocarbons, which consists in diluting a mixture of acetylene and chlorin gases with carbon dioxid, and then submitting the mixture to ultraviolet rays, substantially as described.

In witness whereof I have hereunto signed my name this 21st day of September, 1905, in the presence of two subscribing witnesses.

JOHAN HJALMAR LIDHOLM.

Witnesses:
CARL FRIBERG,
AXEL EHRNERL.